United States Patent
Tiemann et al.

(10) Patent No.: US 11,940,427 B2
(45) Date of Patent: Mar. 26, 2024

(54) LIQUID CHROMATOGRAPHY—STREAM EQUIVALENCE BY SINGLE STREAM CALIBRATION

(71) Applicant: Roche Diagnostics Operations, Inc., Indianapolis, IN (US)

(72) Inventors: Benjamin Tiemann, Munich (DE); Stefan Quint, Munich (DE); Florian Schweinberger, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 390 days.

(21) Appl. No.: 17/448,063

(22) Filed: Sep. 20, 2021

(65) Prior Publication Data
US 2022/0128531 A1 Apr. 28, 2022

(30) Foreign Application Priority Data
Oct. 28, 2020 (EP) .................... 20204420

(51) Int. Cl.
*G01N 30/72* (2006.01)
*G01N 30/02* (2006.01)
*G01N 30/88* (2006.01)

(52) U.S. Cl.
CPC ......... *G01N 30/7266* (2013.01); *G01N 30/88* (2013.01); *G01N 2030/027* (2013.01)

(58) Field of Classification Search
None
See application file for complete search history.

(56) References Cited

U.S. PATENT DOCUMENTS 8,851,528 B2 * 10/2014 Van Pelt ............... F16L 19/065
285/31
2002/0001544 A1 1/2002 Hess et al.
(Continued)

FOREIGN PATENT DOCUMENTS

CN 104091753 A 10/2014
EP 2944955 A1 11/2015
(Continued)

OTHER PUBLICATIONS

European Search Report dated Mar. 17, 2021, in Application No. 20204420.2, 2 pp.
(Continued)

*Primary Examiner* — Harshad R Patel
*Assistant Examiner* — Gedeon M Kidanu
(74) *Attorney, Agent, or Firm* — Taft Stettinius & Hollister LLP

(57) ABSTRACT

A liquid chromatography-mass spectrometry (LC-MS) apparatus including an ionization source coupled to a mass spectrometer and a liquid chromatographic (LC) system coupled to the ionization source. The LC system comprises multiple fluidic streams alternately connectable to the ionization source, thereby assigning a detection time window to each fluidic stream from the multiple fluidic streams when connected to the ionization source. The LC-MS apparatus further comprises a controller configured to carry out steps of monitoring an ionization current of the ionization source for the multiple fluidic streams and identifying differences in flow conditions between the multiple fluidic streams based on the monitored ionization current. The controller is further configured to carry out adjusting detection conditions of one or more of the multiple fluidic streams responsive to the identified differences, thereby enabling eluates of interest
(Continued)

from each fluidic stream to be detected by the mass spectrometer in the respective detection time window.

17 Claims, 5 Drawing Sheets

(56) References Cited

U.S. PATENT DOCUMENTS

| | | |
|---|---|---|
| 2002/0084222 A1 | 7/2002 | Brann |
| 2005/0258360 A1 | 11/2005 | Whitehouse et al. |
| 2006/0043281 A1 | 3/2006 | Yoshinari et al. |
| 2006/0118713 A1 | 6/2006 | Matsui et al. |
| 2007/0183928 A1 | 8/2007 | Neyer et al. |
| 2008/0038152 A1 | 2/2008 | Van Pelt |
| 2008/0083873 A1 | 4/2008 | Giardina |
| 2009/0095902 A1 | 4/2009 | Robinson et al. |
| 2009/0194681 A1 | 8/2009 | McCauley |
| 2011/0192215 A1 | 8/2011 | Finlay |
| 2014/0298990 A1 | 10/2014 | Fan et al. |
| 2016/0139095 A1 | 5/2016 | Gerhardt et al. |
| 2018/0292368 A1 | 10/2018 | Franz et al. |
| 2019/0237314 A1 | 8/2019 | King, III et al. |

FOREIGN PATENT DOCUMENTS

| | | |
|---|---|---|
| EP | 3425369 A1 | 1/2019 |
| EP | 3391041 B1 | 10/2019 |
| GB | 2527803 A | 1/2016 |
| JP | S64-86438 A | 3/1989 |
| WO | 2002/053255 A1 | 7/2002 |
| WO | 2009-091961 A1 | 7/2009 |
| WO | 2012/092281 A2 | 7/2012 |
| WO | 2015110860 A1 | 7/2015 |
| WO | 2020/105624 A1 | 5/2020 |
| WO | 2020/121660 A1 | 6/2020 |

OTHER PUBLICATIONS

Search Report; Chinese Patent Office; Chinese Application No. 202111249290.X; dated Aug. 31, 2023; 2 pages.

* cited by examiner

LIQUID CHROMATOGRAPHY—STREAM EQUIVALENCE BY SINGLE STREAM CALIBRATION

CROSS-REFERENCE TO RELATED APPLICATIONS

This application claims priority to European Patent Application No. 20204420.2, filed 28 Oct. 2020, the disclosure of which is hereby incorporated by reference in its entirety.

TECHNICAL FIELD

The present disclosure is related to a liquid chromatography-mass spectrometry (LC-MS) apparatus including a liquid chromatography (LC) system and an ionization source, where multiple fluidic streams are alternately connectable to the ionization source. The present disclosure is also related to a method for chemical analysis in a LC-MS apparatus.

BACKGROUND

There is growing interest for the implementation of mass spectrometry and more specifically of liquid chromatography (LC) coupled to mass spectrometry in the clinical laboratory as well as in other laboratory settings. In these settings, it is frequently required to process a variety of different assays in a largely automated manner and, if possible, using a random-access mode (i.e., the analyzer can perform any one of multiple assays at any time compared to systems where a large number of samples requiring a particular assay are processed as a batch, or systems where only one or two assays are processed over longer periods of time). Therefore, liquid chromatography-mass spectrometry (LC-MS) apparatuses based on multiple fluidic streams instead of commonly used LC-MS devices comprising only a single stream have recently attracted much attention in the context of minimizing an injection-to-injection cycle time between subsequent samples and providing high-throughput of the apparatus.

However, the streams of a multiple-stream LC-MS systems may be subjected to variances. For instance, LC columns, capillary dimension, valves, etc. may differ between streams which ultimately can affect, e.g., the total and dead volumes. Other reasons may include clogging in different elements along a flow path of a fluidic stream, manufacturer tolerances in capillary dimensions or other constituting elements of the apparatus as well as many other reasons. Because of such inaccuracies, some of prior art LC-MS systems including multiple fluidic streams are prone to have inequivalent flowing conditions in different fluidic streams. The inequivalence between different fluidic streams results in retention time shifts and peak broadening in chromatograms measured by MS even if the same analytes and solvents with a single pregiven LC gradient profile are injected in each fluidic stream from the multiple fluidic streams.

Such retention shifts and their broadening lead, in turn, to a reduction of the MS detection window size and to a deterioration in the analysis quality. To detect an error, it is necessary in some prior art systems to review relevant instrument data, which requires an in-depth technical understanding of the LC-MS system at hand. In many cases, only specially trained service personnel can find and resolve the problem, but even for them it can be a rather complicated and time consuming task. Thus, there is a need in developing new efficient techniques capable of solving the above mentioned problems.

SUMMARY

In accordance with one general embodiment, the present disclosure relates to a liquid chromatography-mass spectrometry apparatus. The LC-MS apparatus includes an ionization source coupled to a mass spectrometer and a liquid chromatographic (LC) system coupled to the ionization source. The LC system comprises multiple fluidic streams alternately connectable to the ionization source, thereby assigning a detection time window to each fluidic stream from the multiple fluidic streams when connected to the ionization source. The LC-MS apparatus further comprises a controller that is configured to carry out steps of monitoring an ionization current of the ionization source for the multiple fluidic streams and identifying differences in flow conditions between the multiple fluidic streams based on the monitored ionization current. The controller is further configured to carry out adjusting detection conditions of one or more of the multiple fluidic streams responsive to the identified differences, thereby enabling eluates of interest from each fluidic stream to be detected by the mass spectrometer in the respective detection time window.

In accordance with another general embodiment, the present disclosure relates to a method for chemical analysis in the LC-MS apparatus of the first general embodiment.

Although the embodiments of the present disclosure are not limited to specific advantages or functionality, firstly, the technique of the present disclosure can use the ionization current as an additional readout mechanism to gain insight into possible deviations in flow conditions between the multiple fluidic streams of the LC-MS apparatus. While measuring the ionization current in itself is known for some systems in the art, the technique of the first and second aspects can exploit the knowledge about profiles of the ionization current for multiple fluidic streams (e.g., peak positions and their heights, profile changes or shifts when going from one measured profile to the other, etc.) to identify specific errors in the LC-MS apparatus such as, e.g., pre- and post-LC column dead volumes, valves defects, manufacturing tolerances in various elements and many others. In addition, identifying specific errors in the present techniques can be carried out for each fluidic stream from the multiple fluidic streams without affecting a measurement time or measurement results.

Secondly, using this knowledge, the technique of the present disclosure can also help to resolve the problem of inequivalence of the fluidic streams. The fluidic streams can be individually recalibrated and their equivalence can thus be restored in some examples. In this way, the present technique can enable eluates of interest from each fluidic stream to be detected by the MS in the respective detection time window.

Thirdly, using an ionization spray current has the additional advantage that no additional equipment might be needed for its measurement and it can be executed after every maintenance action requiring only little effort on the side of the operator. This might lead to shorter service times of the LC-MS system and might reduce the training level required by the operator or technician who is responsible for possible troubleshooting.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which.

Figure 1A:
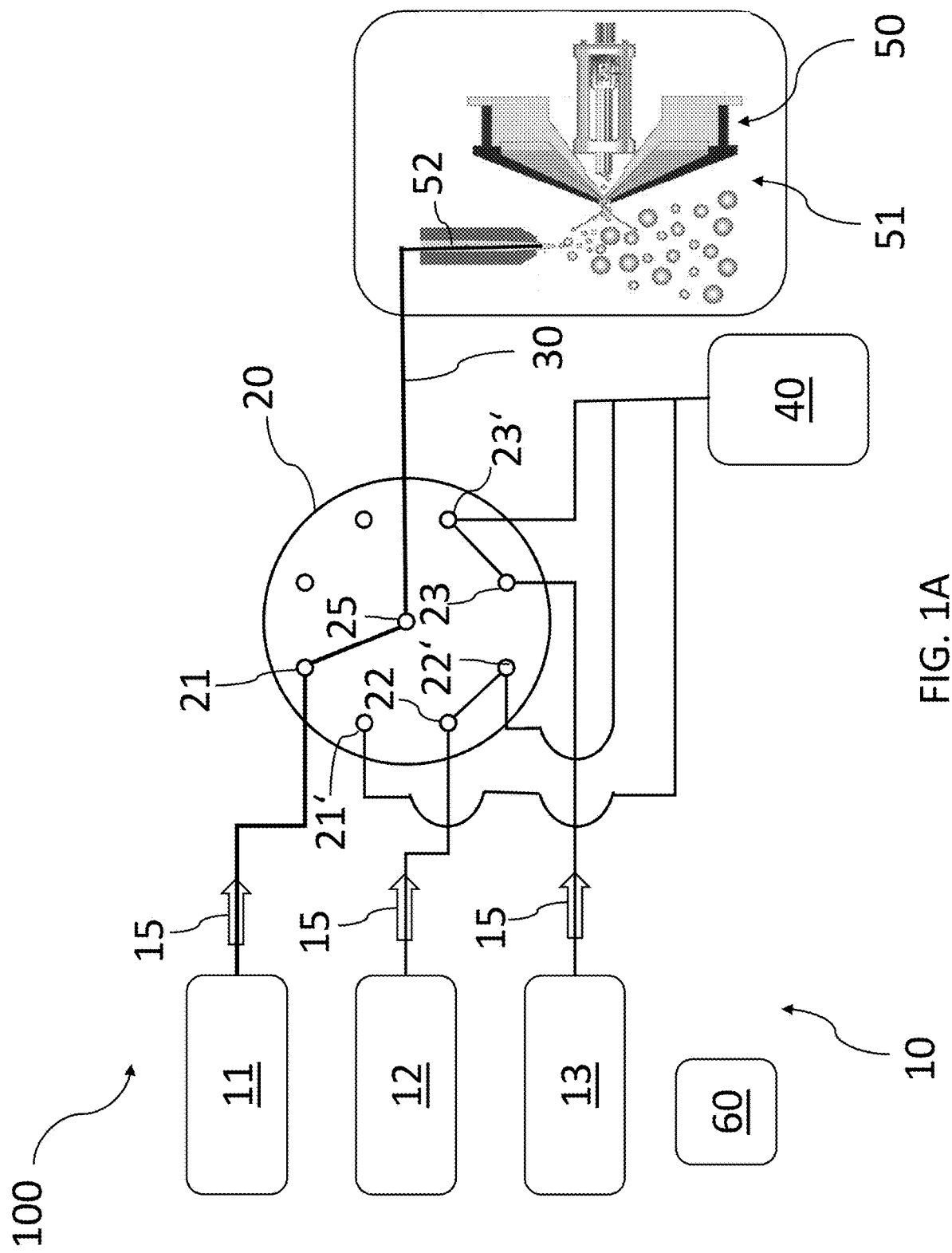
FIG. 1A shows schematically a liquid chromatography-mass spectrometry (LC-MS) apparatus when one fluidic stream from the multiple fluidic streams is connected to an electrospray ionization source.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

The term "liquid chromatography or LC" as used herein can refer to any kind of an analytical process that subjects samples injected by a sample injector to chromatographic separation through an LC column, e.g., in order to separate analytes of interest from each other and therefore to enable their individual detection, for instance, by means of a mass spectrometry detection. In other examples, said analytical process also aims at separating analytes of interest from matrix components, e.g., remaining matrix components after a sample preparation that may still interfere with a subsequent detection. In some examples, such forms of liquid chromatography is used as liquid chromatography performed under pressure, e.g., "high-performance liquid chromatography" or HPLC, "ultra-high-performance liquid chromatography" or UHPLC, "micro liquid chromatography" or μLC and "small-bore liquid chromatography" or small-bore LC.

The term a "liquid chromatographic system or LC system" as used in the present disclosure is an analytical apparatus or module or a unit in an analytical apparatus for carrying out liquid chromatography. The LC system may be embodied as a single channel or as a multi-channel system that may comprise one or a plurality of LC columns arranged in parallel and/or in series. The LC system may also comprise elements such as a sample injector, valves, liquid sources, fluidic connections and parts, e.g., for mixing liquids, degassing liquids, tempering liquids, and the like, one or more sensors, such as pressure sensors, temperature sensors and the like, and especially at least one LC pump. The list is not exhaustive.

The term "sample" refers to a biological material suspected of containing one or more analytes of interest and whose detection, qualitative and/or quantitative, may be associated to a particular condition (e.g., a clinical condition). The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest. Examples of analytes of interest are vitamin D, drugs of abuse, therapeutic drugs, hormones, and metabolites in general. The list is however not exhaustive.

According to some examples, the detector is a mass spectrometer (MS) connected to the ionization source. The ionization source in turn may be connected with the LC system. In some examples, a mass spectrometer may be connected to a valve-to-detector conduit via the ionization source. In some examples the ionization source may be connected with the LC system via the valve-to-detector conduit. In some examples, the LC system can be configured as an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ion current in the individual mass scans and plotting that "totaled" ion current as an intensity point against time.

The term "mass spectrometer (MS)" may refer to an analytical module comprising a mass analyzer designed to further separate and/or detect analytes based on their mass to charge ratio. In some examples, the mass spectrometer is a fast scanning mass spectrometer. However, in other examples the mass spectrometer is a tandem mass spectrometer capable of selecting parent molecular ions, generating fragments by collision-induced fragmentation, and separating the fragments or daughter ions according to their mass to charge (m/z) ratio. In still other examples, the mass spectrometer is a triple quadrupole mass spectrometer, as known in the art. Besides quadrupoles, other types of mass analyzers may be used as well, including time of flight, ion trap or combinations thereof.

The term "LC eluate" exiting an LC fluidic stream is herein used to indicate a fraction of the eluate that comprises at least one analyte of interest.

The term "ionization source" as used herein refers to an interface coupling LC to MS, configured to generate charged analyte molecules (molecular ions) and transferring the charged analyte molecules from a liquid into a gas phase. According to certain embodiments, the ionization source is an electrospray ionization (ESI) source. In other embodiments, the ionization source may be any ionization source in which ionization processes are electrically triggered. The LC/MS interface may also comprise a double ionization source. Typical parts of an ionization source, for instance, of an electrospray ionization (ESI) source, may be a nebulizer and a sampling capillary, typically arranged orthogonally or coaxially with respect to each other. An LC eluate exiting an LC fluidic stream is guided through a probe including a sprayer needle or capillary. In this manner, the LC eluate is nebulized in a volume downstream of the sprayer capillary where ionization takes place and the charged analyte molecules thereby obtained are brought into a gaseous phase. A sampling device (e.g., a sampling capillary or orifice) is provided to collect the ions in the gaseous phase and guide them into the mass spectrometer. The ionization source may further include an assembly to provide a curtain gas, also known as counter gas, (e.g., $N_2$), which reduces the entry of background ions (e.g., solvent clusters) into the MS. The assembly can have a counter plate and an orifice assembly for providing the curtain gas. In some examples, the ionization source comprises a sprayer capillary that forms part of the valve-to detector conduit. Thus, liquid from the fluidic streams, including LC eluates, may alternately flow through the sprayer capillary fluidically connected to the stream-selection valve.

The ionization source may further include an assembly to provide an auxiliary gas, also known as heater gas. In order to optimize ionization conditions, it is also possible to adjust solvent composition by adding a make-up flow directly before the ionization source to adjust pH, salts, buffers or organic content. Such ionization sources are known in the art and not further elucidated here.

The term a "fluidic stream" may refer to a fluidic path through which liquids can flow and in particular through which a sample from a sample injection point may undergo a chromatographic process and can eventually be transferred to a detector, e.g., to a mass spectrometer. In some examples, the fluidic connection through different parts of the fluidic stream may be discontinuous. This is because the fluidic stream may comprise elements such as switching valves that may establish alternative connections and regulate fluidic flow between different parts of the fluidic stream at different times. The fluidic stream may comprise at least one capillary tubing and/or LC column comprising a stationary phase selected according to the type of sample(s) and analytes of interest, and through which a mobile phase is pumped in order to trap and/or separate and elute and/or transfer analytes of interest under selected conditions, e.g., according to their polarity or log P value, size or affinity, as generally known to one person skilled in the art. The at least one LC column may be exchangeable. In particular, the LC system may comprise more LC columns than fluidic streams, where a plurality of LC columns may be selectable, e.g., interchangeably coupled to the same fluidic stream. Capillary tubing may be also used to bypass LC columns or may allow adjustment of dead volumes to fine-tune elution time windows. A fluidic stream may comprise a plurality of substreams. In particular, the LC system in some examples may comprise a plurality of fluidic streams connected to a stream-selection valve for directing flow from one fluidic stream at a time to a mass spectrometer.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "LC column" may also refer to capillaries or channels that are not packed or loaded with a stationary phase, but rely on the surface area of the inner capillary wall or geometrical structures to effect separations. An example is provided by pillar array chromatography, where separation beds are formed by etching away interstitial volumes out of a solid silicon wafer, leaving an array of pillars. The resulting channels can be folded onto a small footprint by concatenating bed segments with optimized flow distributors that limit peak dispersion. This creates a stationary phase support structure that is organized in a reproducible, ordered pattern. An LC column may have different lengths (for example, 5 mm or larger, 20 mm or larger, 50 mm or larger) and inside diameters (for example, 0.1 mm or larger, 1 mm or larger, 5 mm or larger).

A "liquid chromatography pump or LC pump" is a high-pressure pump that may vary in pressure capacity but that can yield a consistent and reproducible volumetric flow rate though an LC channel. Pressure in HPLC may typically reach as high as 60 MPa or about 600 atmospheres, whereas UHPLC and μ-LC systems have been developed to work at even higher pressures, e.g., up to 140 MPa or about 1400 atmospheres, and therefore are able to use smaller particle sizes in the LC columns (<2 μm). In other embodiments, particles used in the LC columns may have a different (desired) size, e.g., equal or larger than 2 or equal or larger than 50 LC pumps may be configured as binary pumps or even quaternary pumps, e.g., in case of conditions requiring the use of elution gradients by gradually varying the ratio between up to four elution solvents.

According to one embodiment, the LC pump can yield a pressure of 60 MPa to 140 MPa, typically 75 MPa to 100 MPa, and more typically 80 MPa. According to one embodiment, the LC pump can be configured to operate with a flow rate between 1 μl/min and 500 μl/min or more, typically up to 1500 μl/min, and more typically operate at flow rates between 100 μl/min to 300 μl/min, and an accuracy of, e.g., about ±5% or less.

The LC pump may comprise more than one pump head. For example, binary pumps comprise two pump heads and each pump head typically comprises a primary pump head and a secondary pump head cooperating with each other for pumping liquid while maintaining the liquid pressure inside the pump head about constant. In particular, each of the primary pump head and of the secondary pump head is typically a syringe-like pump comprising a syringe-like cylinder body having an inner wall surface and a plunger translatable through the cylinder body leaving an interspace between the inner wall surface and the plunger when the plunger is translated through the cylinder body.

A composition of the mobile phase, i.e., concentrations of solvents or mixtures of solvents constituting the mobile phase and aiming at carrying a sample through the stationary phase of the LC column, may be a function that changes over time. Such a chromatographic separation process can be referred to as gradient elution. The desired time-dependence of the composition entering the LC column during the gradient elution can be programmed in advance in some examples.

The term "liquid" in relation to a fluidic stream refers to liquids used in liquid chromatography, e.g., as solvents or mixtures of solvents used, e.g., as mobile phases or eluents (elution solvents), and as known in the art.

The term "dead volume" is defined here as the volume of an LC system between the injection point and the inlet to the ionization source, where a volume of the LC column is excluded. Thus the "dead volume" may include various preand post-column connecting capillaries and/or tubing, the volume of valves, end-fittings, etc.

The term "total volume of a fluidic stream" refers herein to the volume of all capillaries, fittings, valve grooves and the LC column volume of a fluidic stream. The total volume of a fluidic stream may also include a dwell volume and/or a gradient delay volume associated with the pumping systems.

In order that the embodiments of the present disclosure may be more readily understood, reference is made to the following examples, which are intended to illustrate the disclosure, but not limit the scope thereof.

First, an overview over the techniques of the present disclosure will be given in connection with FIGS. 1A-1C. Aspects of the LC-MS techniques of the present disclosure will subsequently be summarized in a flow chart shown in FIG. 2. Last, some typical measurement results in the context of the LC-MS techniques disclosed herein will be demonstrated in connection with FIG. 3.

Figure 1B:
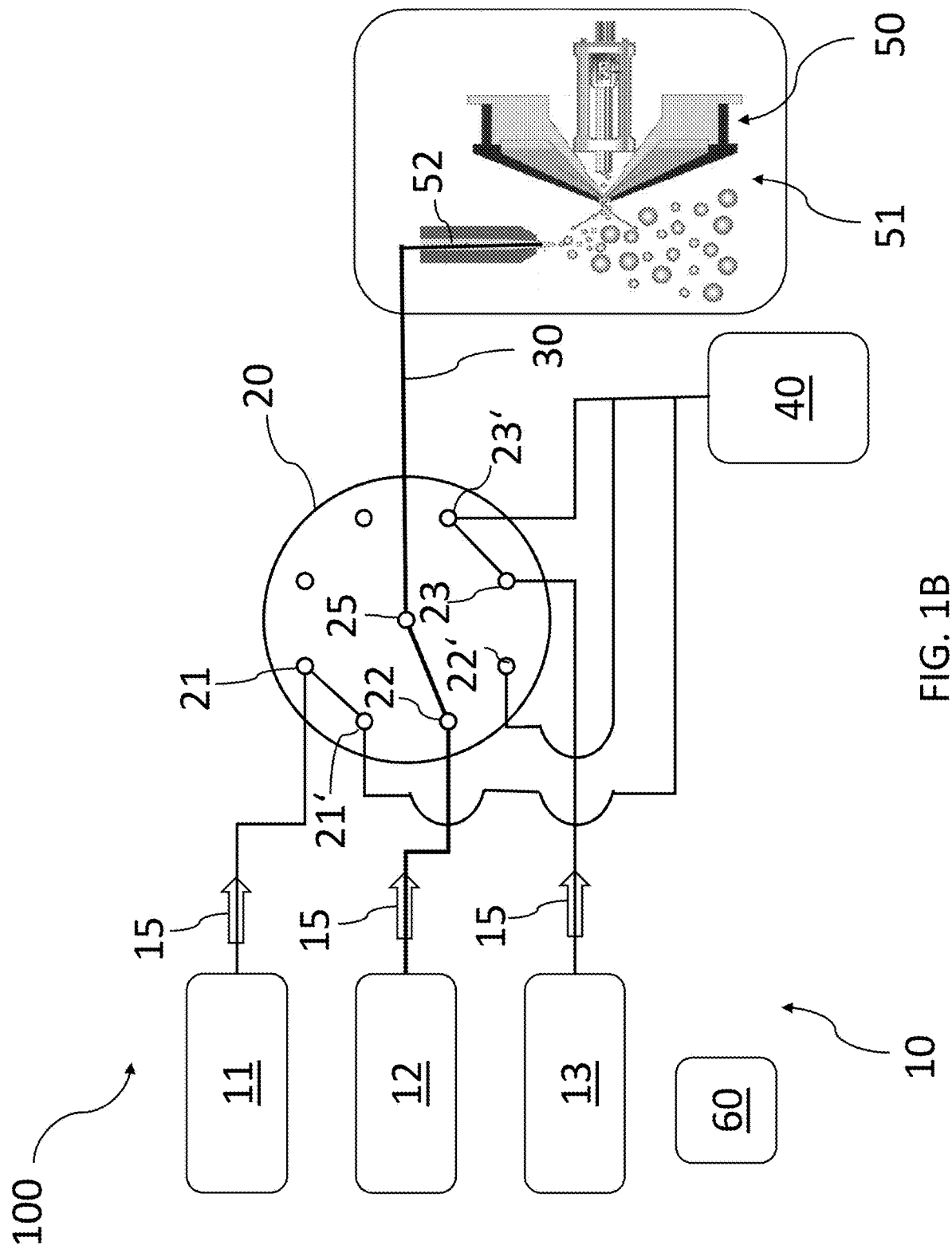
FIG. 1B is the LC-MS apparatus illustrated in FIG. 1A when another fluidic stream from the multiple fluidic streams is connected to the ESI source.
Figure 1C:
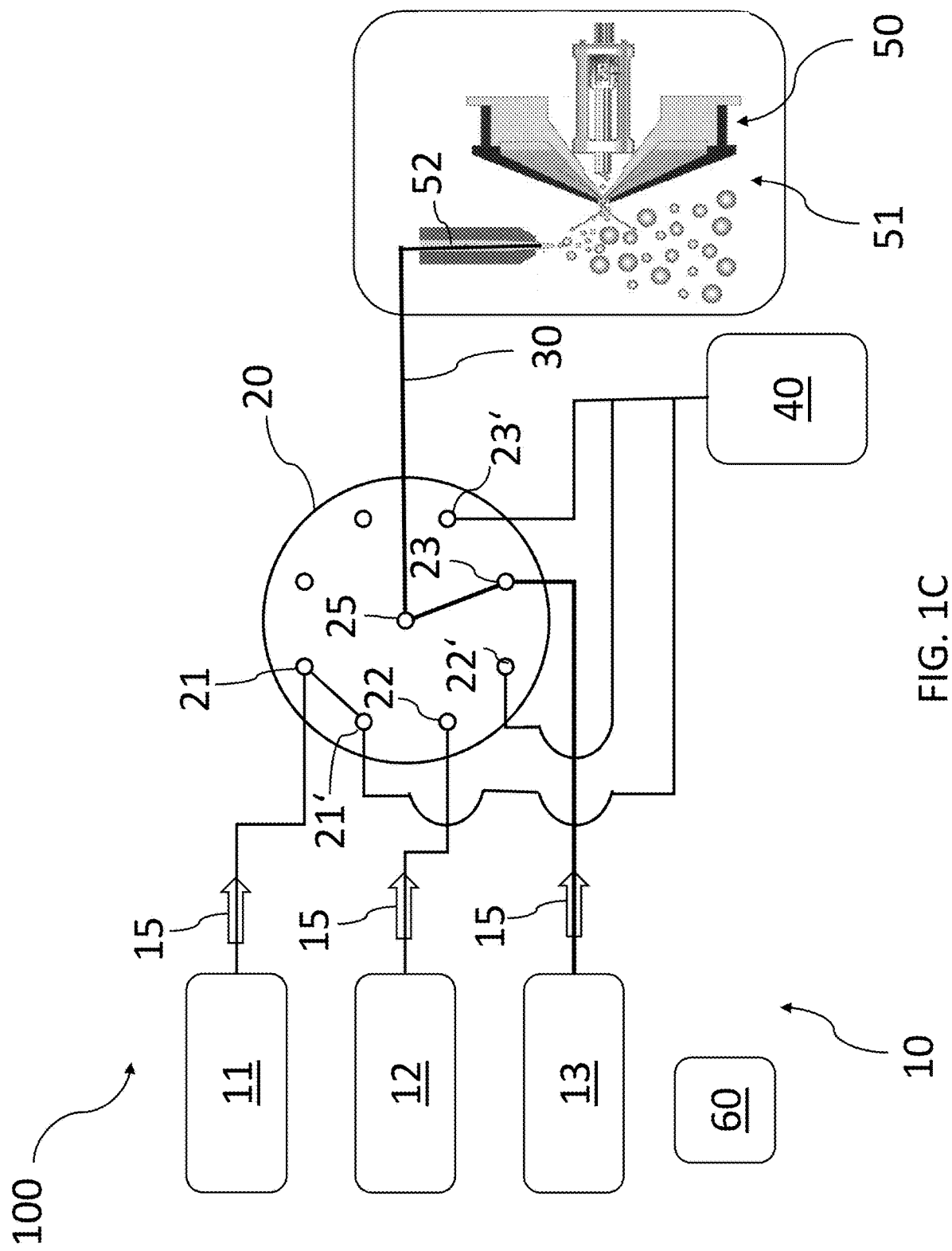
FIG. 1C is the LC-MS apparatus illustrated in FIG. 1A when a third fluidic stream from the multiple fluidic streams is connected to the ESI source.

FIGS. 1A-1C include a schematic example of a LC-MS apparatus 100 according to the present disclosure. The LC-MS apparatus comprises an ionization source 51 coupled to a mass spectrometer (MS) 50 and a liquid chromatographic (LC) system 10 coupled to the ionization source 51. In the present example, an electrospray ionization (ESI) source (51) is taken as the ionization source. The LC system in turn can comprise multiple fluidic streams 11, 12, 13 (e.g., two or more or three or more fluidic streams) alternately connectable to the ionization source 51, thereby assigning a detection time window to each fluidic stream from the multiple fluidic streams when connected to the ionization source 51. In some examples, alternately connecting multiple fluidic streams 11, 12, 13 from the LC system 10 to the ionization source can be carried out in a random fashion, i.e., the order at which the multiple fluidic streams are connected to the ionization source 51 is not kept during operation of the LC-MS apparatus 100. For example, this scenario may take place if the LC-MS apparatus (e.g., an analyzer) operates in a random-access mode. In other examples, alternately connecting multiple fluidic streams can be performed in a predetermined order. In some examples, the predetermined order can be set for the entire time span of operation of the LC-MS apparatus. In other examples, the predetermined order may be reset to a different predetermined order after a certain period of time.

In some examples shown in FIGS. 1A-1C, the LC-MS apparatus can further comprise a stream-selection valve 20 (e.g., a rotary valve) and a valve-to-detector conduit 30 configured to alternatively connect the multiple fluidic streams 11, 12, 13 via a stream-selection valve 20 to let LC eluates flow through a valve-to-detector conduit 30 to the ESI source 51. The LC-MS apparatus ca also include different arrangements for connecting the multiple fluidic streams 11, 12, 13 to the ESI source 51. For example, the LC-MS apparatus can include other stream selection elements than a (rotary) valve. In addition or alternatively, the LC-MS apparatus can include multiple stream selection elements (e.g., stream selection valves). In addition, the LC-MC can include multiple groups of fluidic streams each including two or more fluidic streams connectable to the ESI source.

In the present example an electrospray ionization (ESI) source 51 comprises a sprayer needle or capillary 52, which in some examples can form part of the valve-to detector conduit 30, so that the MS is connected to the valve-to-detector conduit 30 via the ESI source 51. In other examples the sprayer capillary may not necessarily be part of the valve-to detector conduit 30 and is connected to it in a manner known in the art.

In the example depicted in FIGS. 1A-1C, the stream-selection valve 20 comprises a plurality of fluidic-stream ports 21, 22, 23 configured to alternatively connect a respective fluidic stream from the multiple fluidic streams 11, 12, 13 of the LC system with the valve-to-detector conduit 30 in order to provide LC eluates 15 flowing from the respective fluidic stream to be inputted into the ESI source. In some examples, as shown in these figures, the stream-selection valve 20 can additionally be equipped with a valve-to-detector conduit port 25, connected to the valve-to-detector conduit 30. In the example, the stream-selection valve 20 can comprise in addition a plurality of waste ports 21', 22', 23' for each fluidic stream 11, 12, 13 from the multiple fluidic streams that lead to a waste 40. In other examples, the LC-MS apparatus can comprise, e.g., an additional wash-pump configured to connect, with the valve-to-detector conduit 30 at appropriate times, such as between switching two consecutive fluidic streams 11,12; 12,13; 13,11 in order to wash eventual traces of samples from a previous fluidic stream out of the valve-to-detector conduit 30 before liquid from a subsequent fluidic stream enters the valve-to-detector conduit 30. It is understood that the embodiments presented FIGS. 1A-1C is only an example and the number of ports and connections may be adapted in many different ways and in particular according to the number of fluidic streams.

The LC-MS apparatus 100 further can comprise a controller 60 that in some embodiments can be configured to control a fluidic-stream connection time (i.e., the connection time between each fluidic stream 11, 12, 13 and the valve-to-detector conduit 30) by controlling switching of the stream-selection valve 20. In this way, the LC-MS apparatus 100 can ultimately assign a detection time window to each fluidic stream from the multiple fluidic streams when connected to the ionization source. The controller can also assign a detection time window when other stream-selection elements than stream-selection valve 20 are employed by controlling the respective stream-selection elements accordingly.

After leaving a fluidic stream 11, 12, 13, an LC eluate is guided into the ESI source. In some examples, the LC eluate can be passed through the valve-to-detector conduit 30 into the ESI source so that it is nebulized in a volume downstream of the sprayer needle or capillary 52 where ionization occurs, resulting in the production of a gaseous phase of charged analyte molecules (see FIGS. 1A-1C, lower right corner). The controller 60 can be configured to monitor an ionization current of the source (e.g., an electrospray ionization current of the ESI source) for the multiple fluidic streams. In an example, the ionization current of the ionization source can be monitored by measuring the ionization current for the corresponding fluidic stream from the multiple fluidic streams connected to the ionization source within the respective detection time window. In other examples, the ionization current for the corresponding fluidic stream can be monitored during a time interval which is different from the respective detection time window, e.g., by taking the time interval which is smaller than the respective detection time window. The ionization current can be measured using a current measurement device included in or attached to the ionization source. In some examples, a high voltage source can be supplied to the sprayer needle or capillary 52 of the ionization source. The resulting ionization current of the nebulized and subsequently ionized particles in a volume downstream of the sprayer needle or capillary 52 flowing towards an entrance of the mass spectrometer 50 can be measured, for instance, between the sprayer needle or capillary and a counter plate of the mass spectrometer. In some examples, this ionization current can be measured by properly connecting an electrical circuit known in the art to the sprayer needle or capillary and the counter plate.

In a further step, the controller 60 can identify differences in flow conditions of the mass spectrometer between the multiple fluidic streams based on the monitored ionization current. In some examples, the multiple fluidic streams can be set up to be equivalent, i.e., featuring the same flow conditions (i.e., within a predetermined accuracy). This equivalence might not be given initially or during operation of the LC-MS apparatus (i.e., the respective fluidic streams are not equivalent, i.e., they are inequivalent). For example, components (LC columns, capillaries, channels, and/or valves) used in the different fluidic streams can have properties deviating from a nominal property. This difference might be caused by production variances (e.g., two nominally identical components have different properties). In other examples, a fluidic stream can be erroneously configured or equipped with a wrong component (i.e., not according to specification) which can lead to differences in flow conditions. In other examples (or additionally in some examples), a difference in flow conditions can be caused by changes in the flow conditions developed during operation of the LC-MS apparatus (e.g., due to wear of components). The above described inequivalence of the multiple streams can lead to variations in flow paths exhibited by LC eluates flowing in the different fluidic streams. Such differences can, for example, be reflected in the measured shape of the monitored ionization current and/or in a position in time of one or more characteristic features of a profile of the monitored ionization current. These differences can be identified by the controller 60.

In a next step, the controller 60 can be configured to adjust the detection conditions of one or more of the multiple fluidic streams 11, 12, 13 responsive to the identified differences. In this way, the controller 60 enables LC eluates of interest flowing from each fluidic stream to be detected by the mass spectrometer in the respective detection time window. This adjustment step can result in reducing retention time shifts and peak broadening in chromatograms obtained by the LC-MS apparatus provided that a single pregiven LC gradient profile is used for each stream of the multiple fluidic streams.

Figure 2:
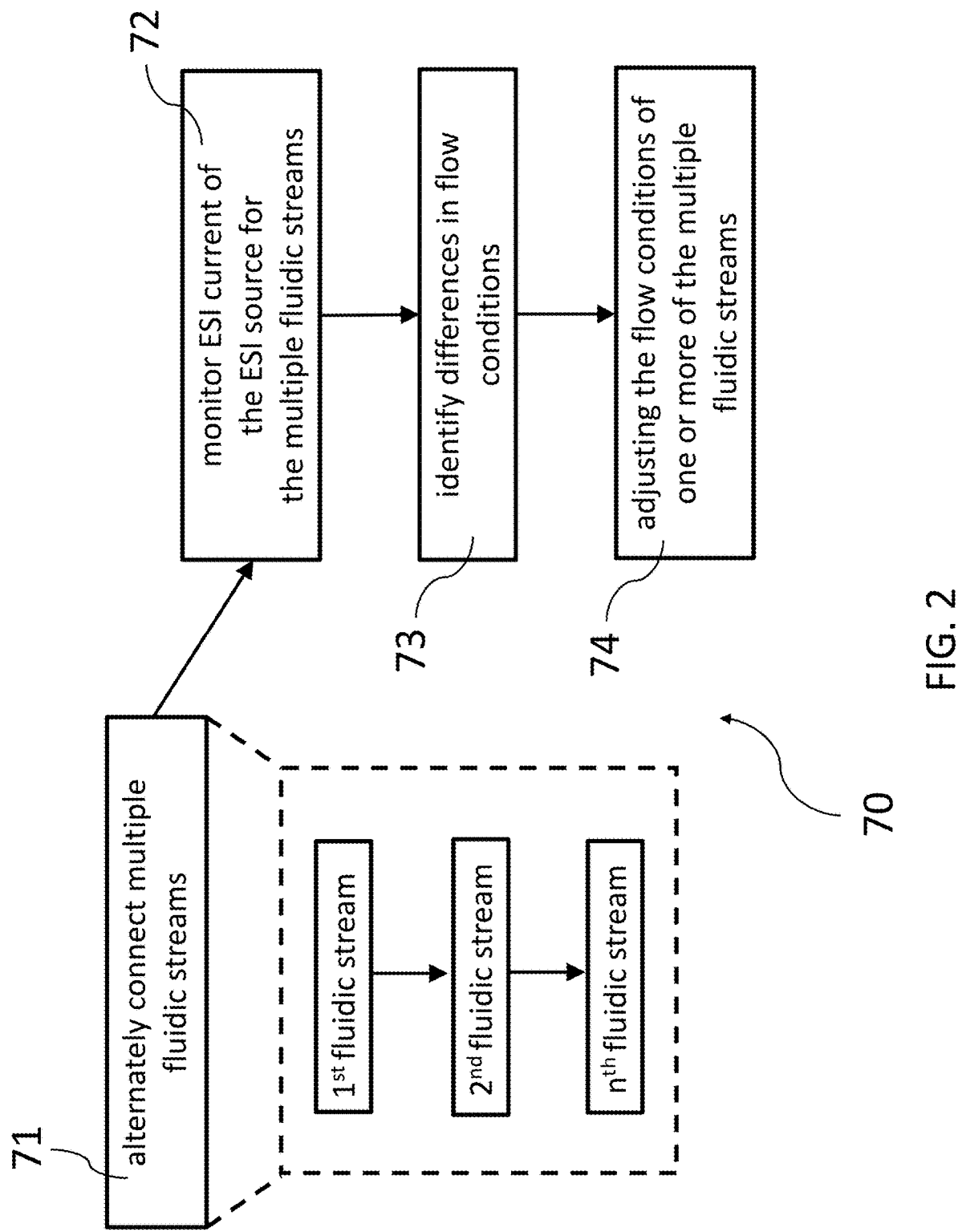
FIG. 2 is a flow diagram illustrating the method for chemical analysis in the LC-MS apparatus of the present disclosure.

Further disclosed and proposed is a method for chemical analysis in a liquid chromatography-mass spectrometry (LC-MS) apparatus schematically shown in FIG. 2 with continued reference to FIGS. 1A-1C, the method comprising alternately connecting 71 multiple fluidic streams 11, 12, 13 from a liquid chromatography (LC) system 10 to an ionization source 51 coupled to the LC system, thereby assigning a detection time window to each fluidic stream from the multiple fluidic streams when connected to the ionization source. The techniques of the present disclosure further comprise monitoring an ionization current 72 of the ionization source for the multiple fluidic streams and identifying differences in flow conditions 73 of the mass spectrometer between the multiple fluidic streams based on the monitored ionization current. The next step of the method includes adjusting detection conditions 74 of one or more of the multiple fluidic streams responsive to the identified differences, thereby enabling eluates of interest from each fluidic stream to be detected by a mass spectrometer (MS) 50 coupled to the ionization source in the respective detection time window.

In particular, FIG. 1A shows a situation when only one of the multiple fluidic streams (e.g., the first fluidic stream) 11 of the LC system is connected to the ESI source 51. In this example, the stream-selection valve 20 is rotated such that the first fluidic stream 11 is connected to the valve-to-detector conduit 30 via a fluidic-stream port 23 and a valve-to-detector conduit port 25 in order to provide the desired connection of the first fluidic stream 11 with the ESI source 51. In the present embodiment, the other fluidic streams 12, 13 can be connected to the waste ports 22', 23' during said detection time window of the first fluidic stream 11, as shown in FIG. 1A. In this manner, the detection time window can be assigned only to the first fluidic stream 11, in which case an LC eluate exiting the first fluidic stream 11 will be guided into the ESI source, ionized therein and finally detected by the MS 50. The subsequent monitoring step of the ESI current with respect to the first fluidic stream 11 can be performed in accordance with the discussions above. In some examples, the same method steps can be repeated with respect to the other fluidic streams of the multiple fluidic streams, for example, with respect to two remaining fluidic streams 12, 13, as shown in FIGS. 1B and 1C. Next, based on the monitored ionization currents, the differences in flow conditions 73 of the mass spectrometer between the multiple fluidic streams can be identified and the adjustment step can be performed in agreement with the above discussions.

In one example, an assigned detection time window for the multiple fluidic streams (or a subset thereof) can be of an identical length and/or a fixed length (over a predetermined period of time). For instance, the LC system 10 can be configured to alternatingly connect to the ionization source 51 by switching between the multiple fluidic streams 11, 12, 13 at a constant pace, thereby assigning a detection time window of a fixed duration to each fluidic stream from the multiple fluidic streams when connected to the ionization source. In other examples, the assigned detection time window for at least one fluidic stream of the multiple fluidic streams may differ from the detection time window assigned to others fluidic streams of the multiple fluidic streams.

In some examples, identifying differences in the flow conditions of the techniques in the present disclosure can involve comparing a sample injection profile (e.g., a time series of the sample injection profile) in the one or more of the multiple fluidic streams with a profile of the monitored ionization current 90 for the respective stream (e.g., with a time series of the monitored ionization current 90). For example, the injection process can include injecting a sample into an LC column of the one of the LC multiple fluidic streams 11, 12, 13. The injection process can be provided by one or more LC pumps connected to the injection assembly (not shown in FIGS. 1A-1C), for instance, an elution pump of the LC-MS apparatus for injecting the sample into a column of the LC fluidic stream. In one example, a system pressure provided by the one or more LC pumps can vary in time resulting in a well-controlled time-dependent sample injection profile at the entrance of the LC column. In one example, the sample injection profile can be represented by a time series of the sample concentration injected into the LC column. In other examples, the sample injection profile can be given by a time series of the sample volumetric flow rate injected into the LC column.

In one example, the sample injection profile used in the comparing step can include an LC gradient profile determining the organic content or inorganic additives (both can be, e.g., constituents of a mobile phase) at each point in time. In some examples, the LC gradient profile can be measured at the entrance of the LC column at each point in time. In other examples, the LC gradient can be measured at some other parts of the LC-MS apparatus at each point in time. In one example, an LC gradient profile may be a simple linear LC gradient. In some other examples, the LC gradient profile can be described by a set of linear functions with different slopes. In still other examples the LC gradient profile can be a non-linear function or a step-wise function in time. As an example, FIG. 3 discloses a typical profile for the LC gradient 80 obtained using the technique of this disclosure.

In other examples, the LC gradient profile 80 for each fluidic stream may be selected so that it can differ from the LC gradient profile used for any other fluidic stream from the multiple fluidic streams 11, 12, 13. In one example, this can be achieved by changing an organic or inorganic content of a solvent with time at a sample injection point to the LC column. In other examples, the LC gradient can be modified by varying volumetric flow rates provided by an LC pump. In still other examples, a single pregiven LC gradient profile can be first used for the multiple fluidic streams for the comparing step.

In some examples, the comparing step can include flowing the LC eluate (i.e., the liquid emerging from the LC column that can comprise at least one analyte of interest and a solvent or a mixture of solvents) to the ionization source for further ionization and subsequent detection in the MS. In this case, the LC eluate can be nebulized and subsequently ionized in a volume downstream of the sprayer needle or capillary of the ionization source. The resulting ionization current of the ionized particles can be measured to obtain said profile of the monitored ionization current 90 for the respective stream.

In one example, the comparing step can involve the time series of the monitored ionization current 90, which spans at least a portion of an injection process of the sample into a column of the LC stream (e.g., more than 20% or more than 50% of a duration of an injection process, or a window of up to 20% or up to 50% of the duration of an injection process). In other examples, the time series can span a complete injection process of a sample into a column of the LC stream. In still other examples, the ionization current can be monitored by measuring the ionization current after a certain estimated period of time. This can take into account a time it takes for the sample injected to the LC column to undergo chromatographic separation and the resulting eluents coming out of the LC column to arrive at the ionization source.

In some examples, the previously described step of comparing the sample injection profile 80 in the one or more of the multiple fluidic streams with the profile of the of the monitored ionization current 90 for the respective stream can further include evaluating the relative positions of one or more characteristic points or features in the sample injection profile (e.g., in a time series of the sample injection profile) and the profile of the monitored ionization current (e.g., a time series of the monitored ionization current 90). The technique of the present disclosure can also include assessing similarities of the sample injection profiles and the profile of the monitored ionization current.

Returning to FIG. 3, the LC gradient profile 80 versus time t is displayed along with the corresponding time series of the monitored ESI current 90, where the latter can be interpreted as a response in the form of the measured current of the nebulized and subsequently ionized eluate to the applied LC gradient profile of this specific shape 80.

The technique of the present disclosure can aim at detecting a dead volume of any of the one or more of the multiple fluidic streams at least partially based on a delay between a start point of the sample injection 81 and a corresponding feature, optionally a peak 91, in the time series of the monitored ESI current. In the example displayed in FIG. 3, due to a sample injection with growing organic content in a solvent, the responding peak 91 in the time series of the ESI current (showing up at around 8 sec) can be traced back to the time required for the injected sample to pass from, e.g., the injection point (or loop) of the respective fluidic stream to an ESI tip (e.g., a sprayer needle or capillary). Thus, the resulting time delay can be associated with the dead volume for the fluidic stream under consideration.

In some other examples, a total volume of the one or more of the multiple fluidic streams can be detected at least partially based on a delay between a point in the sample injection profile at which the organic content or the inorganic additives of the injected sample changes 82 and a respective feature in the time series of the monitored ESI current 92. In the example presented in FIG. 3, the high-value organic content within the LC gradient drops abruptly 82 (at a moment of time around 110 sec) back to initial values with the lowest value of the organic content (the so-called flash-back mode). It is seen from this figure that the plateau of the corresponding ESI current remains practically unchanged for some period of time, which in this example is about 12 sec, and only after this period the ESI current responds to this event of dropping the organic content and its value starts to decrease with time. In this example, the resulting time delay can be attributed to the total volume of the fluidic stream under consideration.

Figure 3:
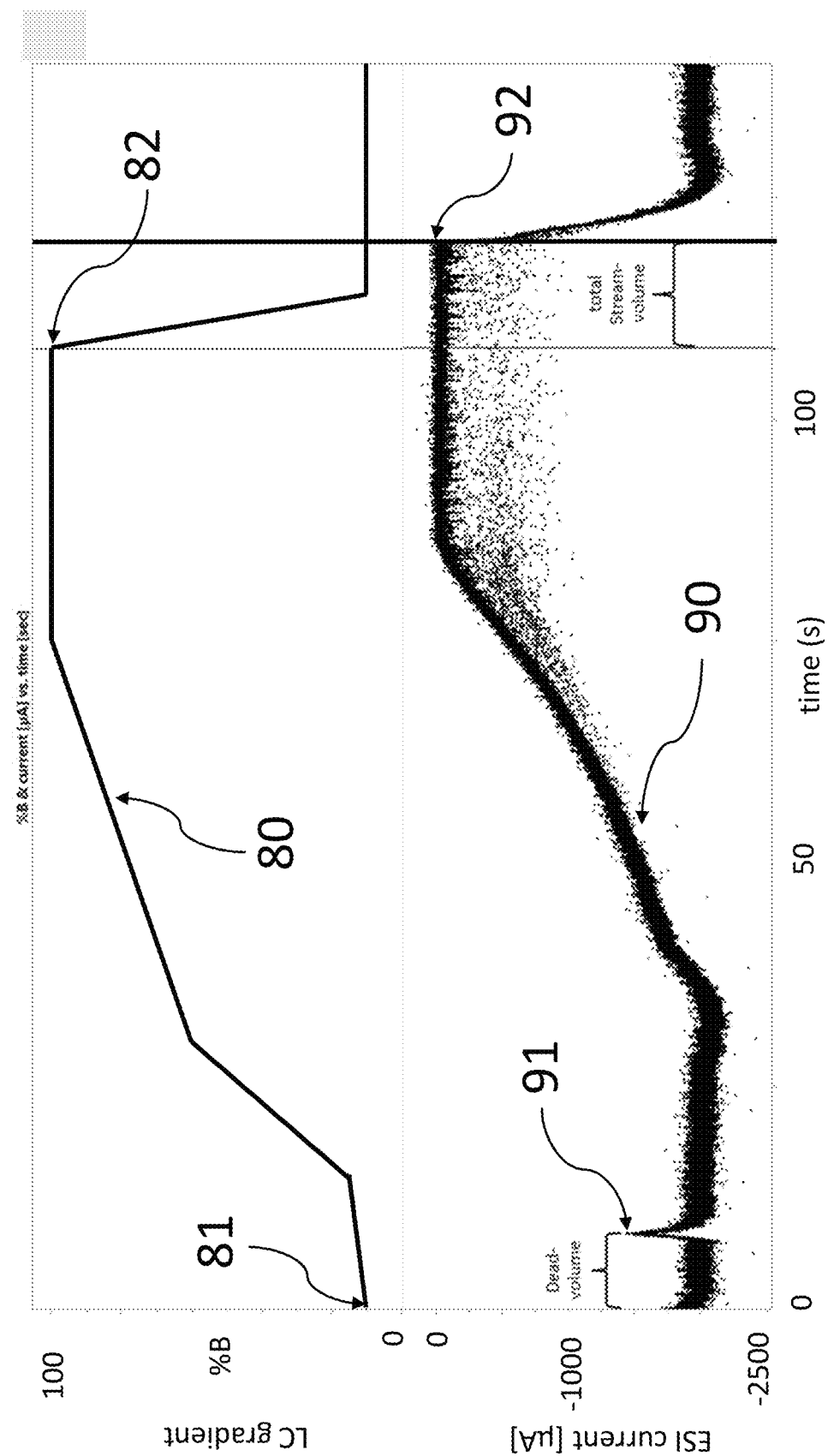
FIG. 3 is an experimental example showing an LC gradient versus time as well as the corresponding measured response of the ESI current versus time t.

It is understood that the LC gradient delay profile and the responding ESI current shown in FIG. 3 exemplify only one possible protocol, as any number of different profiles for the LC gradient delay, organic or inorganic solvents may also be contemplated by the present disclosure.

In addition or alternatively, identifying differences in the flow conditions of the present techniques can include comparing a profile of the monitored ionization current (e.g., a time series of the profile of the monitored ionization current) of the one or more of the multiple fluidic streams with a reference profile of an ionization current (e.g., with a time series of the reference profile of the ionization current). The reference time series of the ionization current can be, e.g., measured at a particular point (e.g., after setup or maintenance of the LC system 10). In other examples, the reference time series of the ionization current can be estimated and/or calculated for a specific LC-MS apparatus in use (e.g., based on information regarding the configuration of the LC-MS apparatus and/or data measured on the LC-MS apparatus). The reference time series of the ionization current can be stored in a database and retrieved from the database by the controller 60. For instance, the time series of the monitored ESI current measured for the one or more of the multiple fluidic streams can have a profile 90 shown in FIG. 3. This profile can be compared with a reference time series of ESI current.

In some other examples, identifying differences in the flow conditions can involve assessing a profile shift or a profile change of the monitored ionization current. In one example, the assessing step can include comparing a profile shift or a profile change of the monitored ionization current of one of the multiple fluidic streams with respect to a time series of the monitored ionization current of the same stream measured during a previous connection of this stream to the ionization source. In some other examples, the assessing step can include comparing a profile shift or a profile change of the monitored ionization current of one of the multiple fluidic streams with respect to the ionization current of the other stream or streams. In some examples, a single pregiven LC gradient profile 80 such as that shown in FIG. 3 can be used for the multiple fluidic streams when performing the assessing step. Only in the case of equivalence between the multiple fluidic streams, the resulting shapes of the monitored ionization currents measured for each fluidic stream from the multiple fluidic streams will coincide with each other.

The techniques of the present disclosure can include identifying the differences in flow conditions between the multiple fluidic streams based on the monitored ionization current, which are related to systematic flow delays in any of the one or more of the multiple fluidic streams 11, 12, 13 compared to the other fluidic stream or streams. As discussed above, these differences can have multiple causes. In one example, one of the fluidic streams can have a larger or smaller dead volume than one or more other fluidic streams. In addition or alternatively, one of the fluidic streams can have a larger or smaller total volume than one or more other fluidic streams. In one example, the dead volume and/or total volume can be detected for each fluidic stream from the multiple fluidic streams 11, 12, 13 in a similar fashion as disclosed above in connection with FIG. 3. Any difference in the dead or total volume between the multiple fluidic streams can lead to, respectively, a time shift in the expected position of the corresponding peak or to a profile shift in the time series of the monitored ionization current. In one example, these shifts can be used to identify the differences in flow conditions between the multiple fluidic streams. In other examples, the LS-MS apparatus can perform measurements different from those depicted in FIG. 3 to identify such differences.

In some other examples the present techniques can include identifying the differences in flow conditions related to systematic flow delays in any of the one or more of the multiple fluidic streams compared to the other fluidic stream or streams caused by a valve condition, e.g., a valve wear or a valve defect. In still other examples, the differences in flow conditions can be identified, which are related to systematic flow delays in any of the one or more of the multiple fluidic streams compared to the other fluidic stream or streams caused by an LC column condition, e.g., an LC column aging or an LC column defect. In other examples of the present techniques, identifying the differences in flow conditions based on the monitored ionization current can comprise identifying the differences related to systematic flow delays in any of the one or more of the multiple fluidic streams compared to the other fluidic stream or streams caused by a clogging, e.g., by an LC column clogging or by a valve clogging. In still other examples, identifying the differences in flow conditions can involve identifying the differences related to systematic flow delays in any of the one or more of the multiple fluidic streams compared to the other fluidic stream or streams caused by a leakage (e.g., a leakage caused by a loosely connected LC column or capillary, a leakage in an LC column or capillaries and/or in a valve or other connecting elements). In other examples, the identified differences in flow conditions based on the monitored ionization current can comprise identifying the differences related to systematic flow delays in any of the one or more of the multiple fluidic streams compared to the other fluidic stream or streams caused by incorrect fitting of one or more LC columns. In still other examples, the identified differences in flow conditions based on the monitored ionization current can comprise identifying the differences in flow conditions related to systematic flow delays in any of the one or more of the multiple fluidic streams compared to the other fluidic stream or streams resulting from manufacturing tolerances in one or more components of the LC system. In some examples, each of the aforementioned identified differences can be correspondingly identified in a time series of the monitored ionization current: For instance, referring back to the example of FIG. 3, new peaks, profile shifts or profile changes, broadening of the existing peak, etc. can additionally show up in a shape of the time series of the monitored ESI current as compared to the example presented in this figure.

In a further step, the techniques of the present disclosure can include adjusting the detection conditions of the one or more of the multiple fluidic streams responsive to the identified differences. This can involve a modification of the one or more fluidic streams to ensure that the eluates of interest from the respective streams arrive in the respective detection time window (e.g., a detection time window of a fixed duration if the streams are switched at a constant pace). In other words, any mismatch between an expected arrival time and an actual arrival time (e.g., caused by the causes discussed above) can be reduced or even eliminated.

In one example, adjusting the detection conditions can involve changing a sample injection time of the one or more of the multiple fluidic streams. In addition or alternatively, adjusting the detection conditions can involve matching sample injection times of the one or more of the multiple fluidic streams. For instance, such differences can be identified with respect to the first fluidic stream 11 of FIG. 1A, which is connected to the ESI source 51 within the respective detection time window during operation of the LC-MS apparatus. In one example, the detection conditions for this fluidic stream 11 can be adjusted in response to the identified differences by matching a sample injection time on a subsequent connection of the first fluidic stream 11 to the ESI source. In a similar manner, the adjusting step of the present techniques can also be carried out for the other fluidic streams 12, 13 shown in FIGS. 1B and 1C during operation of the LC-MS apparatus.

In some other examples, adjusting the detection conditions of any of the one or more of the multiple fluidic streams (e.g., for three fluidic streams 11, 12, 13 disclosed in connection with FIGS. 1A-1C) can include a delayed or expedited sample injection with respect to a predefined sample injection time. In still other examples, sample injection times can be updated for the one or more fluidic streams to adjust the flow conditions.

In still other examples, the adjusting step of the present technique can comprise changing an elution profile by changing a pump parameter of an LC pump. This can involve one or more of delayed or expedited elution by a delayed or expedited LC pump action compared to a predefined LC pump action. In addition or alternatively, changing a pump parameter of an LC pump can include one or more of changing an LC pump pressure or speed. In other examples, the adjusting step can involve adjusting elution conditions by a change in a solvent or an LC gradient profile. These measures can also be combined.

In the present disclosure, the adjustment of the detection conditions of any of the one or more of the multiple fluidic streams can be carried out individually for each of the one or more of the multiple fluidic streams. The techniques of the present disclosure can include the controller configured to automatically adjust the detection conditions of the one or more of the multiple fluidic streams based on the identified differences. Thus, the adjustment step of the present disclosure in connection with the examples listed above can restore the equivalence of the multiple fluidic streams.

A number of aspects of the techniques related to a liquid chromatography-mass spectrometry apparatus including a liquid chromatography system and an ionization source, where multiple fluidic streams are alternately connectable to the ionization source have been discussed in the preceding sections. In addition, the techniques of the present disclosure can also be carried out according to the following aspects:

Aspect 1. A liquid chromatography-mass spectrometry (LC-MS) (100) apparatus comprising:
- an ionization source (51) coupled to a mass spectrometer (50);
- a liquid chromatographic (LC) system (10) coupled to the ionization source (51), wherein the LC system comprises multiple fluidic streams (11, 12, 13) alternately connectable to the ionization source, thereby assigning a detection time window to each fluidic stream from the multiple fluidic streams when connected to the ionization source,
- wherein the apparatus further comprises a controller (60) that is configured to carry out steps of:
- monitoring an ionization current (72) of the ionization source for the multiple fluidic streams;
- identifying differences in flow conditions between the multiple fluidic streams based on the monitored ionization current;
- adjusting detection conditions of one or more of the multiple fluidic streams responsive to the identified differences, thereby enabling eluates of interest from each fluidic stream to be detected by the mass spectrometer in the respective detection time window.

Aspect 2. The apparatus of aspect 1, wherein the LC system is configured to provide alternate connecting to the ionization source by switching between the multiple fluidic streams at a constant pace, thereby assigning a detection time window of a fixed duration to each fluidic stream from the multiple fluidic streams when connected to the ionization source.

Aspect 3. The apparatus of aspect 1 or 2, wherein identifying differences in the flow conditions includes comparing a sample injection profile in the one or more of the multiple fluidic streams with a profile of the monitored ionization current (90) for the respective stream.

Aspect 4. The apparatus of aspect 3, wherein the sample injection profile includes an LC gradient profile (80) determining an organic content or inorganic additives at each point in time.

Aspect 5. The apparatus of aspect 3 or 4, wherein comparing includes evaluating the relative positions of one or more characteristic points or features in the sample injection profile and the profile of the monitored ionization current.

Aspect 6. The apparatus of any one of aspects 3 to 5, wherein comparing includes assessing similarities of the sample injection profiles (80) and the profile of the monitored ionization current (90).

Aspect 7. The apparatus of any one of aspects 3 to 6, wherein a dead volume of any of the one or more of the multiple fluidic streams is detected at least partially based on a delay between a start point of the sample injection (81) and a corresponding feature, optionally a peak (91), in the profile of the monitored ionization current.

Aspect 8. The apparatus of any one of aspects 4 to 7, wherein a total volume of the one or more of the multiple fluidic streams is detected at least partially based on a delay between a point in the sample injection profile at which the organic content or the inorganic additives of the injected sample changes (82) and a respective feature in the profile of the monitored ionization current (92).

Aspect 9. The apparatus of aspect 1 or 2, wherein identifying differences in the flow conditions includes comparing a profile of the monitored ionization current of the one or more of the multiple fluidic streams with a reference profile of an ionization current.

Aspect 10. The apparatus of any one of aspects 1 to 9, wherein identifying differences in the flow conditions includes assessing a profile shift or a profile change of the monitored ionization current.

Aspect 11. The apparatus of any one of aspects 1 to 10, wherein identifying the differences in flow conditions based on the monitored ionization current comprises identifying the differences related to systematic flow delays in any of the one or more of the multiple fluidic streams compared to the other fluidic stream or streams caused by a larger or smaller dead volume or by a larger or smaller total volume.

Aspect 12. The apparatus of any one of aspects 1 to 11, wherein identifying the differences in flow conditions based on the monitored ionization current comprises identifying the differences related to systematic flow delays in any of the one or more of the multiple fluidic streams compared to the other fluidic stream or streams caused by a valve condition, e.g., a valve wear or a valve defect.

Aspect 13. The apparatus of any one of aspects 1 to 12, wherein identifying the differences in flow conditions based on the monitored ionization current comprises identifying the differences related to systematic flow delays in any of the one or more of the multiple fluidic streams compared to the other fluidic stream or streams caused by an LC column condition, e.g., an LC column aging or an LC column defect.

Aspect 14. The apparatus of any one of aspects 1 to 13, wherein identifying the differences in flow conditions based on the monitored ionization current comprises identifying the differences related to systematic flow delays in any of the one or more of the multiple fluidic streams compared to the other fluidic stream or streams caused by clogging, e.g., by an LC column clogging or by a valve clogging.

Aspect 15. The apparatus of any one of aspects 1 to 14, wherein identifying the differences in flow conditions based on the monitored ionization current comprises identifying the differences related to systematic flow delays in any of the one or more of the multiple fluidic streams compared to the other fluidic stream or streams caused by a leakage.

Aspect 16. The apparatus of any one of aspects 1 to 15, wherein identifying the differences in flow conditions based on the monitored ionization current comprises identifying the differences related to systematic flow delays in any of the one or more of the multiple fluidic streams compared to the other fluidic stream or streams caused by incorrect fitting of one or more LC columns.

Aspect 17. The apparatus of any one of aspects 1 to 16, wherein identifying the differences in flow conditions based on the monitored ionization current comprises identifying the differences in flow conditions related to systematic flow delays in any of the one or more of the multiple fluidic streams compared to the other fluidic stream or streams resulting from manufacturing tolerances in one or more components of the LC system.

Aspect 18. The apparatus of any one of aspects 1 to 17, wherein adjusting the detection conditions comprises matching a sample injection time of the one or more of the multiple fluidic streams.

Aspect 19. The apparatus of any one of aspects 1 to 18, wherein adjusting the detection conditions of any of the one or more of the multiple fluidic streams comprises a delayed or expedited sample injection with respect to a predefined sample injection time.

Aspect 20. The apparatus of any one of aspects 1 to 19, wherein adjusting the detection conditions of any of the one or more of the multiple fluidic streams comprises a delayed or expedited elution by a delayed or expedited LC pump action with respect to a predefined LC pump action or by a change of LC pump parameter, e.g., an LC pump pressure or speed.

Aspect 21. The apparatus of any one of aspects 1 to 20, wherein adjusting the detection conditions of any of the one or more of the multiple fluidic streams comprises adjusting elution conditions by a change in a solvent or an LC gradient profile.

Aspect 22. The apparatus of any one of aspects 1 to 21, wherein adjusting the detection conditions of any of the one or more of the multiple fluidic streams is carried out individually for each of the one or more of the multiple fluidic streams.

Aspect 23. The apparatus of any one of aspects 18 to 22, wherein the controller is configured to automatically adjust the detection conditions of the one or more of the multiple fluidic streams based on the identified differences.

Aspect 24. The apparatus of any one of aspects 1 to 23, wherein the ionization source is an electrospray ionization (ESI) source (51).

Aspect 25. A method for chemical analysis in a liquid chromatography-mass spectrometry (LC-MS) apparatus (70), the method comprising:
- alternately connecting (71) multiple fluidic streams (11, 12, 13) from a liquid chromatography (LC) system (10) to an ionization source (51) coupled to the LC system, thereby assigning a detection time window to each fluidic stream from the multiple fluidic streams when connected to the ionization source;
- monitoring an ionization current (72) of the ionization source for the multiple fluidic streams;
- identifying differences in flow conditions (73) between the multiple fluidic streams based on the monitored ionization current;
- adjusting detection conditions (74) of one or more of the multiple fluidic streams responsive to the identified differences, thereby enabling eluates of interest from each fluidic stream to be detected by a mass spectrometer (50) coupled to the ionization source in the respective detection time window.

26. The method of aspect 25, wherein alternating connecting to the ionization source comprises switching between the multiple fluidic streams at a constant pace, thereby assigning a detection time window of a fixed duration to each fluidic stream from the multiple fluidic streams when connected to the ionization source.

The controller of the present disclosure can be embodied in any suitable form (e.g., using any suitable hardware or software). In some examples, the controller can be a stand-alone computer device. In other examples, the controller can be integrated in a computer device or system which also serves other purposed than carrying out the steps of the techniques of the present disclosure. The controller can be arranged locally or remotely connected (over a suitable network) to a site where the LC-MS system is located.

Further disclosed and proposed is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of method steps as disclosed herein may be performed by using a computer or a computer network, typically by using a computer program.

Further disclosed and proposed is a computer program product having program code, in order to perform the method according to the present disclosure in one or more of the embodiments enclosed herein when the program is executed on a computer or computer network. Specifically, the program code may be stored on a computer-readable data carrier.

Further disclosed and proposed is a data carrier having a data structure stored thereon, which, after loading into a computer or computer network, such as into a working memory or main memory of the computer or computer network, may execute the method according to one or more of the embodiments disclosed herein.

Further disclosed and proposed is a computer program product with program code stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed is a modulated data signal which contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing measurements.

Further disclosed and proposed is a computer, or computer network, comprising at least one processor, wherein the processor is adapted to perform the method according to one of the embodiments described in this description.

Further disclosed and proposed is a computer loadable data structure that is adapted to perform the method according to one of the embodiments described in this description while the data structure is being executed on a computer.

Further disclosed and proposed is a storage medium, wherein a data structure is stored on the storage medium and wherein the data structure is adapted to perform the method according to one of the embodiments described in this description after having been loaded into a main and/or working storage of a computer or of a computer network.

What is claimed is:

1. A liquid chromatography-mass spectrometry (LC-MS) apparatus comprising:
an ionization source coupled to a mass spectrometer;
a liquid chromatographic (LC) system coupled to the ionization source, wherein the LC system comprises multiple fluidic streams alternately connectable to the ionization source, thereby assigning a detection time window to each fluidic stream from the multiple fluidic streams when connected to the ionization source,
wherein the apparatus further comprises a controller that is configured to carry out steps of:
monitoring an ionization current of the ionization source for the multiple fluidic streams;
identifying differences in flow conditions between the multiple fluidic streams based on the monitored ionization current;
adjusting detection conditions of one or more of the multiple fluidic streams responsive to the identified differences, thereby enabling eluates of interest from each fluidic stream to be detected by the mass spectrometer in the respective detection time window.

2. The apparatus of claim 1, wherein the LC system is configured to provide alternate connecting to the ionization source by switching between the multiple fluidic streams at a constant pace, thereby assigning a detection time window of a fixed duration to each fluidic stream from the multiple fluidic streams when connected to the ionization source.

3. The apparatus of claim 1, wherein identifying differences in the flow conditions includes comparing a sample injection profile in the one or more of the multiple fluidic streams with a profile of the monitored ionization current for the respective stream.

4. The apparatus of claim 1, wherein identifying differences in the flow conditions includes comparing a profile of the monitored ionization current of the one or more of the multiple fluidic streams with a reference profile of an ionization current.

5. The apparatus of claim 1, wherein identifying differences in the flow conditions includes assessing a profile shift or a profile change of the monitored ionization current.

6. The apparatus of claim 1, wherein identifying the differences in flow conditions based on the monitored ionization current comprises identifying the differences related to systematic flow delays in any of the one or more of the multiple fluidic streams compared to the other fluidic stream or streams caused by a larger or smaller dead volume or by a larger or smaller total volume.

7. The apparatus of claim 1, wherein identifying the differences in flow conditions based on the monitored ionization current comprises identifying the differences related to systematic flow delays in any of the one or more of the multiple fluidic streams compared to the other fluidic stream or streams caused by a valve condition.

8. The apparatus of claim 7, wherein the valve condition is a valve wear or a valve defect.

9. The apparatus of claim 1, wherein identifying the differences in flow conditions based on the monitored ionization current comprises identifying the differences related to systematic flow delays in any of the one or more of the multiple fluidic streams compared to the other fluidic stream or streams caused by an LC column condition.

10. The apparatus of claim 9, wherein the LC column condition is an LC column aging, or an LC column defect, or LC column clogging, or by incorrect fitting of one or more LC columns.

11. The apparatus of claim 1, wherein identifying the differences in flow conditions based on the monitored ionization current comprises identifying the differences related to systematic flow delays in any of the one or more of the multiple fluidic streams compared to the other fluidic stream or streams caused by a leakage.

12. The apparatus of claim 1, wherein identifying the differences in flow conditions based on the monitored ionization current comprises identifying the differences in flow conditions related to systematic flow delays in any of the one or more of the multiple fluidic streams compared to the other fluidic stream or streams resulting from manufacturing tolerances in one or more components of the LC system.

13. The apparatus of claim 1, wherein adjusting the detection conditions comprises matching a sample injection time of the one or more of the multiple fluidic streams, or adjusting elution conditions by a change in a solvent or an LC gradient profile.

14. The apparatus of claim 13, wherein the controller is configured to automatically adjust the detection conditions of the one or more of the multiple fluidic streams based on the identified differences.

15. The apparatus of claim 1, wherein adjusting the detection conditions of any of the one or more of the multiple fluidic streams comprises a delayed or expedited sample injection with respect to a predefined sample injection time.

16. The apparatus of claim 1, wherein the ionization source is an electrospray ionization (ESI) source.

17. A method for chemical analysis in a liquid chromatography-mass spectrometry (LC-MS) apparatus, the method comprising:
alternately connecting multiple fluidic streams from a liquid chromatography (LC) system to an ionization source coupled to the LC system, thereby assigning a detection time window to each fluidic stream from the multiple fluidic streams when connected to the ionization source;
monitoring an ionization current of the ionization source for the multiple fluidic streams;
identifying differences in flow conditions between the multiple fluidic streams based on the monitored ionization current;
adjusting detection conditions of one or more of the multiple fluidic streams responsive to the identified differences, thereby enabling eluates of interest from each fluidic stream to be detected by a mass spectrometer coupled to the ionization source in the respective detection time window.

* * * * *